A. LANGERFELD.
Stop-Work for Swing Gas-Brackets.

No. 198,125.  Patented Dec. 11, 1877.

ATTEST:
Ewald Langerfeld
Otto Laddey

INVENTOR
Arthur Langerfeld.

UNITED STATES PATENT OFFICE.

ARTHUR LANGERFELD, OF NEW YORK, N. Y.

IMPROVEMENT IN STOP-WORKS FOR SWING GAS-BRACKETS.

Specification forming part of Letters Patent No. 198,125, dated December 11, 1877; application filed July 21, 1877.

*To all whom it may concern:*

Be it known that I, ARTHUR LANGERFELD, of the city of New York, in the State of New York, have invented a new and useful Improvement in Stop-Works for Swing-Brackets, which improvement is fully set forth in the following specification and accompanying drawings, in which—

Figure 1:
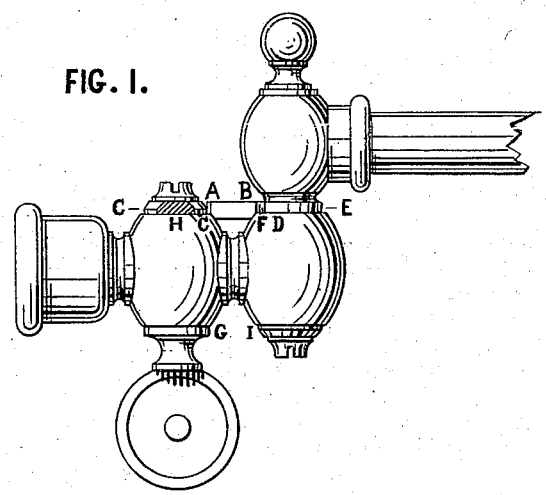
Figure 2:
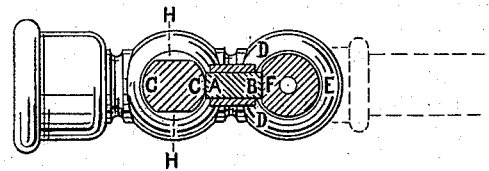

Figure 1 is a side view of a part of a swing-bracket with the stop-work attached to it. Fig. 2 is a section at C E, showing the position of the stop-work when the gas is turned on; and Fig. 3 is a section at C E, showing the position of the stop-work while the gas is turned off.

The object of my invention is to furnish a device by which swing-brackets, with one or more joints, are stopped at a safe distance from any inflammable objects which may be near them, or fixed in a safe position when the gas is turned on, and which will allow the bracket to swing freely when the gas is turned off.

In the drawings, A B is a bolt, which is moved by the projections C C on the washer or plug of the stop-cock, and by the projections D D on the plug or washer of the joint.

Figure 3:
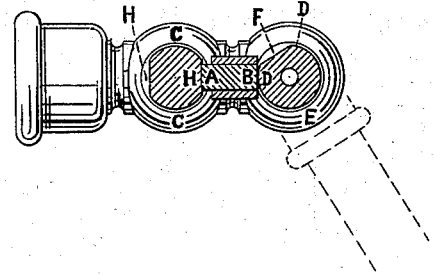

When the gas is being turned on, while the bracket is in a safe position, Fig. 2, the end B of the bolt will be moved into the recess F; but if the bracket is in a dangerous position, Fig. 3, the gas cannot be turned on, because the projecting part D E D will be in the way of the bolt, and the end A of the bolt will be in the way of the projections C C.

When the gas is turned on, Fig. 2, the bracket cannot be swung into a dangerous position, because the end B of the bolt is then in the recess F, and the bolt cannot be moved back, because one of the projections C C is in its way.

The amount of swing is regulated by the distance between the two projections D D— that is, the width or length of the recess F. If the bracket is to be fixed, the width of the recess F is made equal to the width of the end B of the bolt.

When the gas is turned off, Fig. 3, the bracket will swing freely, because one of the projections D D will push the bolt back into one of the recesses H H.

The bolt A B may either be placed between the washer C H C H of the stop-cock and the plug E F of the joint, or between the plug G of the stop-cock and the washer I of the joint, or anywhere between the two plugs, as it may best be adapted to the style of the bracket, and the bolt may be of any shape, or entirely hidden from view, as it may best conform to the design of the bracket.

If the cock is made to turn only one-quarter of a revolution instead of all around, or one-half around, as it is assumed in the drawings and description, then one projection C and one recess H, instead of two of each, will be sufficient.

If the bracket has more than one joint, a stop work and cock may be placed at each joint.

Having thus described my invention, what I claim as new, and desire to secure by Letters Patent, is—

The stop-work for swing-brackets, consisting of the bolt A B, the recesses H H, the projections C C, the recess F, and projections D D, all substantially as shown and described.

ARTHUR LANGERFELD.

Witnesses:
EWALD LANGERFELD,
OTTO LADDEY.